Patented Apr. 28, 1953

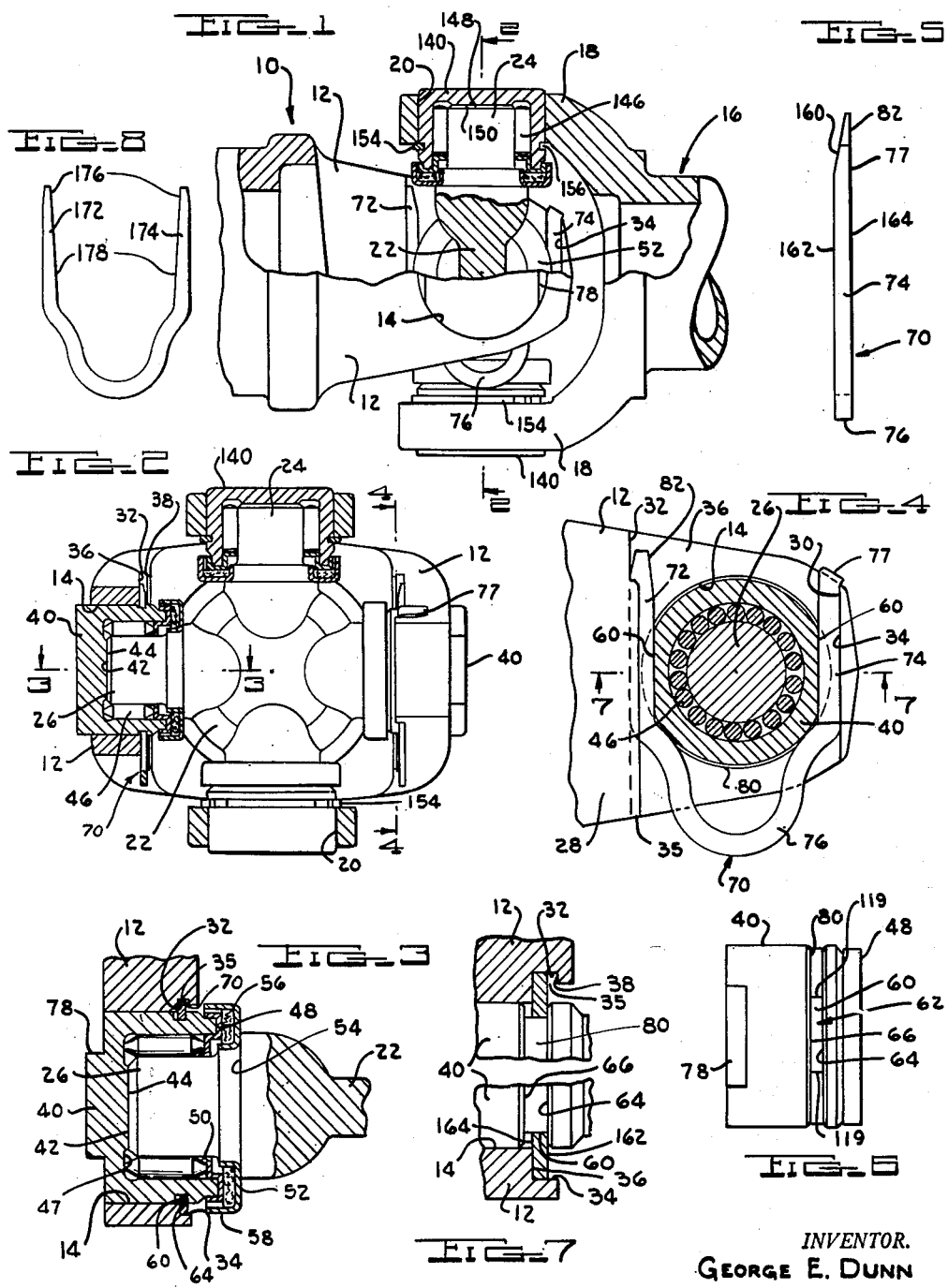

2,636,362

UNITED STATES PATENT OFFICE 2,636,362

UNIVERSAL JOINT

George E. Dunn, Dearborn, Mich., assignor to Universal Products Company, Inc., Dearborn, Mich., a corporation of Delaware Application August 27, 1949, Serial No. 112,797

5 Claims. (Cl. 64—17)

This invention relates to universal joint assemblies and particularly to a joint assembly adapted for use in the drive system of a motor vehicle.

This invention has particular reference to a new and improved construction for universal joint assemblies which reduces the cost of the joint assemblies without any sacrifice in the performance thereof, and in addition facilitates the assembly and disassembly of the joint.

The principal object of the invention, therefore, is to provide a novel universal joint assembly which costs less to build and is easier and less expensive to assemble than comparable joint assemblies of the type now in use.

Other and further objects of the invention will be apparent from the following description and claims and may be understood by reference to the accompanying drawings, of which there is one sheet, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 1 is a side elevational view, partly in section, of a universal joint embodying the invention;

Fig. 2 is a sectional view with parts shown in elevation and taken generally along the line 2—2 of Fig. 1, looking in the direction of the arrows;

Fig. 3 is an enlarged sectional view through one of the bearing cups and taken along the line 3—3 of Fig. 2;

Fig. 4 is an enlarged sectional view taken along the line 4—4 of Fig. 2;

Fig. 5 is a side elevational view of the bearing retainer;

Fig. 6 is a side elevational view of the bearing cup;

Fig. 7 is an enlarged fragmentary sectional view taken along the line 7—7 of Fig. 4; and Fig. 8 is a plan view of a modified form of retainer.

The joint assembly embodying the invention as illustrated is of the cross trunnion type and includes in general the rotary yoke or body 10 having spaced parallel and opposed arms 12, each provided with a cylindrical aperture 14. The yoke 10 may be otherwise formed so as to be secured to a shaft or other rotary part. A rotary yoke or member 16 is provided with opposed parallel arms 18, each provided with a cylindrical aperture 20. The arms 18 are each disposed ninety degrees angularly relative to each of the arms 12.

A cross member 22 is provided with two radially extending trunnions 24 axially aligned with each other and with two radially extending trunnions 26 axially aligned with each other. The trunnions 24 project into the apertures 20, while the trunnions 26 project into the apertures 14. The trunnions 24 and 26 are each angularly disposed at right angles relative to each other, and such trunnions lie in the same plane.

The apertures 14 in the arms 12 are axially aligned and of the same diameter. The apertures 20 in the arms 18 are also axially aligned with each other and of the same diameter. Each of the arms 12 has a side or face 28 thereof provided with a slot 30 intersecting the aperture 14 therein and forming a pair of oppositely disposed shoulders 32 and 34. The shoulders 32 and 34 face each other and are disposed outwardly of the aperture 14. The shoulder 32 forms the bottom wall of a slot or groove 35 which is disposed normal to the slot 30, the bottom wall 36 of the slot 30 forming one side of the slot 35 and an abutment, the shoulder 32 forming the bottom wall of such slot, and a shoulder or abutment 38 forming the other wall of such slot. The bottom wall 36 of the slot 30 is a finished surface and is disposed normal to the axis of the aperture 14, and the shoulder 38 faces such bottom wall 36.

A bearing cup 40 is positioned in each of the apertures 14 and has a slip fit therein, each bearing cup 40 being positioned around one of the trunnions 26 with the end surface 42 of the trunnions seated against the bottom inside surfaces 44 of the cups 40 so that the bearing cups have end thrust bearing engagement with the trunnions 26 to center the cross member 22 with respect to the yoke 10.

The bearing cups 40 house a series of needle rollers 46 which are arranged between the trunnion 26 and the inner cylindrical finished surface of the cups 40. One of the ends of each of the needle rollers 46 projects into an annular groove 47 which surrounds the bottom finished surface 44 of the cup 40. An annular retainer 48 for the rollers 46 is fitted and secured on the rim of the cup 40 and includes a radially extending portion 50 which projects inwardly across the ends of the needle rollers and then axially thereof so as to properly position the needle rollers 46 in the cup 40 even when the cup 40 is disassembled from the trunnion 26.

An annular member 52, channel shaped in cross section, is fitted and secured around the base of the trunnion and against an annular shoulder 54 thereof, the member 52 forming a support for a compressible sealing member 56. The part of the bearing retainer 48 overlying the rim of the cup 40 seats against the annular sealing member 56 so as to form a running seal between the base of the trunnion and the rim of the bearing cup, the seal serving to retain lubricant within the cup and to exclude dirt therefrom. It should be noted that the outer rim 58 of the member 52 is arranged in surrounding and spaced relation with the rim of the cup 40. The sealing member 56 may be of cork, felt or other suitable material and impregnated with lubricant, and when the joint is assembled as shown in Figs. 1, 2, 3 and 4, the sealing member 56 is compressed between the bottom of the member 52 and the annular portion of the bearing retainer 48 which makes contact with the sealing member 56.

Each of the bearing cups 40 on the outer peripheral surface thereof is provided with a pair of chordal flats 60 which form the bottom surface of grooves 62 having side shoulders 64 and 66. When assembled, the flats 60 are arranged opposite and face the shoulders 32 and 34, such flats 60 and shoulders 32 and 34 being disposed generally in parallel relation to each other.

In each slot 30 there is arranged a bearing cup retainer 70 having legs 72 and 74 which straddle the cup 40, and a looped end 76 which projects beyond the slot 30 and the arm 12. The overall width of the retainer 70 as shown in Fig. 4 is such so that the retainer 70 has a slip fit between the shoulders 32 and 34. The leg 74 of the retainer engages one of the flats 60 and the shoulder 34, while the leg 72 engages the other flat 60 and the shoulder 32, thereby securing the cup 40 against rotation in the aperture 14 in the arm 12.

The end 77 of the leg 74 is deflected over the edge of the slot 30 after the retainer 70 is positioned therein so as to prevent the retainer 70 from being displaced from the slot 30. The retainer 70 preferably is formed of soft steel. The face 164 of the retainer 70 is seated against the bottom surface 36 of the slot, and the shoulder 38 overlaps the leg 72 of the retainer. The face 162 of the retainer 70 engages the shoulders 64 of the grooves 62 in the bearing cup 40, thereby preventing outward movement of the bearing cups axially of the openings 14. It will also be observed that the retainers 70 prevent the bearing cups 40 from moving axially inwardly of the openings 14 since the engagement of the retainers 70 with the shoulders 38 of the slot 35 and with the shoulders 66 of the grooves 62 will prevent such movement. The retainers 70 thus secure each of the bearing cups 40 in the opening 14 against rotation and against axial movement in both directions. The retainers 70 also position the cups 40 so as to center the cross member 22 with respect to the yoke 10.

The outer ends of the bearing cups 40 may be provided with flats 78 aligned with the flats 60 so that the flats 60 may be properly disposed relative to the shoulders 32 and 34 in order to permit the legs 72 and 74 of the retainers 70 to penetrate between the flats 60 and the shoulders 32 and 34.

It will be observed that the tangential grooves 62 form a part of an annular groove 80 on the peripheral surface of the bearing cups 40. The groove 80 facilitates the insertion of the ends of the legs 72 and 74 into the space between the flats 60 and the shoulders 32 and 34 if the flats 60 are not properly positioned relative to the shoulders 32 and 34. The ends of the legs 72 and 74 are also tapered or wedge-shaped, as indicated at 82, so as to facilitate the penetration of the ends of such legs into the spaces between the flats 60 and the shoulders 32 and 34, and if the flats 60 are not properly aligned with the shoulders 32 and 34, the penetrating movement of the legs 72 and 74 will turn the bearing cups 40 to properly position the flats 60 relative to the shoulders 32 and 34.

If the parts are made within the proper manufacturing tolerances, the assembled components usually will be slightly eccentric in either direction, i. e., the bearing cup 40 will be closer to the shoulder 32 than to the shoulder 30, or vice versa, due to the fact that the manufacturing tolerances will be taken up on one side which automatically produces a tight fit of one leg of the retainer 70 between the flat 60 on the bearing cup 40 and the shoulder on the yoke arm on the same side of the bearing cup. Because of this, variations in the fit of the retaining means due to tolerances within the manufacturing limits are reduced to a minimum and hence the possibilities of loose fitting and sloppy fastening of the bearing cups are practically eliminated. Thus the bearing cups 40 are positively secured against any rotation about their axis in the apertures in the yoke arms. This is important as under stresses, vibrations and impacts encountered in the use of the joint there is a tendency of the cups 40 to turn about their axis, which if not restrained will cause premature deterioration and failure of the joint.

After the retainer 70 is positioned in the slot 30 and with its looped end 76 seated against the bearing cup 40, the end of the leg 74 which projects beyond the slot 30 of the arm 12 is bent so as to lock the retainer 70 in the slot 30. Since the retainer 70 is formed of a soft metal, such as soft steel, the end 77 of the leg 74 may readily be bent and will remain in a bent position until it is straightened by a tool in order to permit the removal of the retainer 70.

The final assembly of universal joints installed as original equipment on motor vehicles, such as automobiles, usually takes place on the assembly line at the automobile plant. At this time the yoke or body 10 is secured to one part of the driving system and the yoke or rotary member 16 is secured to another part which is to be arranged in driving relation by means of the universal joint with the part to which the yoke 10 is secured. The cross member 22 usually is furnished to the car manufacturer assembled to the yoke 16. The trunnions 24 of the cross 22 project into the apertures 20 in the arms 18 and each trunnion is journaled in a bearing cup 140 which is quite similar in construction to the bearing cup 40 and is provided with the needle rollers 146, and the end faces 148 of the trunnions 24 are seated against the bottoms 150 of the cups 140 so that the bearing cups 140 have end thrust bearing engagement with the trunnions 24 to center the member 22 with respect to the axis of rotation of the yoke 16.

While the bearing cups 140 may be of the same construction as the bearing cups 40 and secured in the openings 20 in the same manner as that in which the bearing cups 40 are secured, the bearing cups 140 are shown each press fitted into its respective aperture 20. A U-shaped snap ring 154 positioned in an annular groove 156 in the outer peripheral surface of the cup 140 is seated against the inner edge of the apertures 20 for locating the bearing cups 140 in the apertures 20 and with respect to the arms 18. The press fit of the bearing cups 140 in the apertures 20 secures the bearing cups 140 against displacement, and each bearing cup 140 and its associated trunnion are provided with a running seal like that previously described.

In assembling the cross 22 to the yoke 10 the trunnions 26 are arranged in the apertures 14. One of the bearing cups 40 is then positioned in one of the apertures 14 and on the trunnion 26 which projects into such aperture, the needle rollers 46 previously having been assembled in the bearing cup 40 and secured therein by the bearing retainer 48, and the seal supporting ring 52 and the seal 56 having previously been assembled to the cross 22. The bearing cup 40 is then positioned so that the flats 60 thereof are arranged opposite and substantially parallel with the shoulders 32 and 34, and one of the retainers 70 is slid into the slot 30 so that the legs 72 and 74 will straddle the bearing cup and until the looped end 76 of the retainer 70 is seated against the bearing cup 40 and with the legs 72 and 74 positioned between the flats 60 and the shoulders 32 and 34, as shown in Fig. 4. The end 77 of the leg 74 is then deflected over the edge of the arm 12. Inasmuch as the bearing cup 40 has a slip fit in the aperture 14, it could slip through were it not for the engagement between leg 72 of the retainer and shoulder 38. Even if the bearing cup 40 did not slip completely through aperture 14, if it slipped far enough so that the retainer 70 passed the shoulders 30 and 32, the bearing cup 40 might be rotated so that the retainer would not fall back into place when the other side of the joint is assembled. Thus, the shoulder 38 cooperates with the retainer 70 during final assembly of the joint to hold the bearing cup temporarily in place thereby insuring proper positioning of the parts during assembly and efficient assembly of the joint. Such bearing cup is thus positioned and secured to the yoke 10.

The joint may then be rotated about its axis 180° so as to bring the other arm 12 into position for assembly of the other bearing cup 40 thereto.

Another bearing cup 40 is assembled in the aperture 14 and over the other trunnion 26 and with the flats 60 of such bearing cup positioned approximately parallel to the shoulders 32 and 34. The size of the seals 56 as made is such that such seals 56 are compressed to a limited extent when the joint is assembled. In assembling the first of the bearing cups 40 in its aperture 12 and on its trunnion 26 no compression of the seal 56 takes place because the cross 22 is not at such time secured against movement axially of the trunnions 26. However, when the second bearing cup 40 is assembled on its trunnion 26, both seals 56 must be compressed in order to properly position the bearing cup 40 in its aperture 14. The ends of the legs 72 and 74 are made wedge-shaped, as indicated at 160, so that the ends of the legs 72 and 74 will penetrate the grooves 62 in the bearing cup 40.

Referring to Fig. 5, it will be observed that the face 162 is provided with the sloping surface which forms the wedge-shaped end 160 and the retainer 70 should be assembled in the slot 30 with the face 162 presented toward the cross 22, while the opposite face 164 should be presented to and seated on the bottom surface 36 of the slot 30. The wedge-shaped ends 160 of the legs 72 and 74 will in the assembly of the second bearing cup 40 drawn the bearing cup 40 endwise toward the cross member 22 and thereby effect proper compression of the seals 56 as the retaining member 70 is driven to its seated position in the slot 30. Thereafter the end 77 of the leg 74 is bent over the edge of the arm 12, as shown in Fig. 4, to lock the retainer 70 in the slot 30 and thereby locking the second bearing cup 40 in its operative position. This completes the assembly of the joint.

The looped end 76 of the retainer 70 projecting beyond the arm 12 makes it possible to engage the retainer 70 with a tool to pull the same out of its slot 30 when it is desired to disassemble the joint.

This construction not only reduces the cost of manufacture of the joint without any sacrifice in the performance thereof, but also expedites the final assembly of the joint and reduces the cost of such final assembly. This construction also makes it possible to reduce to a limited extent the weight of the joint assembly.

In the modified form of retainer illustrated in Fig. 8 the legs 172 and 174 thereof may each be tapered in width so that when assembled in the joint in the manner illustrated in Fig. 4, such legs 172 and 174 will completely fill and be wedged in the space between the flats 60 and the shoulders 32 and 34, and thereby positively lock the bearing cup 40 against rotation. The legs 172 and 174 at their ends 176 should be of such size so as to penetrate the spaces between the flats 60 and the shoulders 32 and 34, and such legs may be tapered inwardly along the sides 178 thereof so that the width of the legs 172 and 174 when the retainer is assembled as shown in Fig. 4 is somewhat greater than the maximum distance between each flat 60 and its opposed shoulder 32 or 34.

While the retainer 70 illustrated in the previous modification secures the bearing cup 40 against rotation, it is not contemplated that the legs 72 and 74 of such retainer will have a wedged fit between the flats 60 and the shoulders 32 and 34, but rather that the retainer 70 will have a slip fit between the flats 60 and the shoulders 32 and 34. This might in some instances, due to an accumulation of manufacturing tolerances, permit an extremely minute amount of turning of the cup 40 in its aperture 14. This possibility could be entirely prevented by employing the retainer illustrated in Fig. 8 which would have a wedged fit with respect to the shoulders 32 and 34 and the flats 60 of the cup 40.

The retainer shown in Fig. 8, like that shown in the previous modification, preferably is formed of soft steel or similar non-hardened metal. If because of some defect or impairment in the joint in use, the bearing cup 40 is turned in its aperture 14 sufficient to the end that the transverse edges 119 at the ends of the flats 60 gouge out the metal of the legs 72 and 74 of the retainer to an extent to which the cooperation between the flats 60 and the legs 72 and 74 is inoperative to prevent the turning of the bearing cup 40, the sides of the annular groove 80 will by cooperation with the legs 72 and 74 prevent the bearing cup 40 from moving axially with respect to the aperture 14, even though at such time the bearing cup may be free to turn in its aperture.

While I have illustrated and described preferred embodiments of my invention, it is understood that these are capable of modification, and I therefore do not wish to be limited to the precise details set fourth, but desire to avail myself of such changes and alterations as fall within the purview of the following claims.

I claim:

1. In a universal joint, a rotary yoke having spaced arms, each provided with a cylindrical aperture, said apertures being axially aligned and of the same diameter, each of said arms being provided with a slot intersecting the aperture therein and forming a pair of oppositely disposed shoulders parallel with the axis of said apertures and facing each other and which shoulders are spaced apart an amount at least as great as the diameter of said apertures, the bottom of each of said slots being a finished surface and normal to the axis of said apertures, a rotary member having a pair of aligned trunnions, one trunnion projecting into each of said apertures, a bearing cup around each trunnion and each bearing cup being arranged with a slip fit in one of said apertures, said bearing cups having end thrust bearing engagement with said trunnions to center said member with respect to said yoke, each of said bearing cups, in the outer peripheral surface thereof, being provided with chordal flats arranged opposite to and facing each of said shoulders and a radially extending shoulder arranged normal to said flats and opposite to and facing the bottom surface of one of said slots, a bearing cup retainer in the form of a U seated against the bottom surface of each of said slots with the legs of each of said retainers disposed adjacent to and confined between said shoulders of said slot in which said retainer is seated, the legs of each of said retainers being rigid and substantially flat and straddling a bearing cup, one of said legs of each of said retainers having a snug fit and being confined in unyielding abutting relationship between one of the shoulders formed by said slot in which it is seated and one of said flats of one of said bearing cups so as positively to prevent any rotation of said bearing cup in its aperture, said one of said legs of each of said retainers being seated against and having a snug fit between the bottom surface of said slot in which it is seated and said shoulder of said one of said bearing cups so as positively to prevent axial movement of said bearing cup in its aperture and to positively center said rotary member in said yoke, and means integral with each of said arms and overhanging one of said slot shoulders and the leg of the retainer abutting the same and spaced from said last-mentioned retainer leg.

2. In a universal joint, a rotary body having spaced arms, each provided with a cylindrical aperture, said apertures being axially aligned, each of said arms being provided with a slot intersecting the aperture therein and forming a pair of oppositely disposed shoulders parallel with the axis of said apertures and facing each other and a bottom wall disposed normal to said shoulders, a rotary member having a pair of aligned trunnions, one trunnion projecting into each of said apertures, a bearing cup around each trunnion and each bearing cup being positioned with a slip fit in one of said apertures, each of said bearing cups in the outer peripheral surface thereof being provided with a pair of chordal flats and a shoulder facing said bottom wall, each of such flats being arranged opposite to and facing one of said shoulders formed by said slot, a bearing cup retainer disposed between and seated against each of said bottom walls and said shoulder of each of said bearing cups, with the legs of each of said retainers being rigid and substantially flat and confined between the shoulders of the slot in which each of said retainers is disposed and the flats of a bearing cup, the legs of each of said retainers straddling a bearing cup and one of said legs of each of said retainers being rigidly confined in unyielding abutting relation between one of said flats and one of said shoulders of the slot in which said leg is disposed so as positively to prevent any rotation of the bearing cup relative to its associated arm, an annular compressible running seal operatively positioned and compressed between each of said bearing cups and its associated trunnion, at least one of said retainers being operative, to react on the shoulder of a bearing cup and the oppositely disposed one of said bottom walls to forcibly hold the bearing cups on their seats against the ends of said trunnions and against the compression of said seals.

3. In a universal joint, a rotary yoke having spaced arms, each provided with a cylindrical aperture, said apertures being axially aligned, each of said arms being provided with a slot intersecting and normal to the aperture therein and forming a pair of oppositely disposed shoulders parallel with the axis of said apertures and facing each other and a pair of oppositely facing surfaces disposed normal to said shoulders, a rotary member having a pair of aligned trunnions, one trunnion projecting into each of said apertures, a bearing cup around each trunnion and arranged with a slip fit in each of said apertures, said bearing cups having end thrust bearing engagement with said trunnions to center said member with respect to said yoke, each of said bearing cups in the outer peripheral surface thereof being provided with oppositely disposed outwardly facing chordal flats, each flat being arranged opposite to and facing one of said shoulders, and each of said bearing cups being provided with a radially extending shoulder normal to said flats and arranged opposite to and facing one of said surfaces, a bearing cup retainer in the form of a U seated against one of said surfaces of each of said arms with the legs of each of said retainers disposed in one of said slots and adjacent to and confined between said shoulders thereof, the legs of each of said retainers being rigid and flat and each bearing cup being straddled by the legs of a retainer, one of said legs of each of said retainers having a snug fit and being confined in unyielding abutting relation between one of said slot shoulders and one of said flats so as positively to prevent any rotation of said bearing cups in said apertures, and one of said legs of each of said retainers being seated against and having a snug fit between one of said surfaces and one of said bearing cup shoulders so as positively to prevent outward axial movement of said bearing cups in said apertures and to positively center said rotary member in said yoke, said other of said surfaces of each arm overhanging and spaced from at least one of the legs of a retainer to limit the inward axial movement of a bearing cup in its aperture.

4. A universal joint according to claim 2 wherein each of said retainers has an end thereof bent over an arm of said body for preventing displacement of said retainer from its slot.

5. A universal joint according to claim 2 wherein the ends of said retainer legs and said grooves embody provisions to facilitate the insertion of said legs into said grooves in the event said grooves are not properly aligned relative to said shoulders, said provisions being operative upon insertion of said legs into said grooves to accurately position said bearing cups in said apertures.

GEORGE E. DUNN.

References Cited in the file of this patent

UNITED STATES PATENTS

| Number | Name | Date |
| --- | --- | --- |
| 1,197,204 | Hesse et al. | Sept. 5, 1916 |
| 2,020,253 | Braun | Nov. 5, 1935 |
| 2,036,978 | Anderson | Apr. 7, 1936 |
| 2,114,861 | Slaght | Apr. 19, 1938 |